United States Patent [19]

Hoffman

[11] Patent Number: 4,524,805

[45] Date of Patent: Jun. 25, 1985

[54] NORMALLY CLOSED DUCKBILL VALVE AND METHOD OF MANUFACTURE

[76] Inventor: Allan C. Hoffman, 5876 Republic St., Riverside, Calif. 92504

[21] Appl. No.: 511,837

[22] Filed: Jul. 8, 1983

[51] Int. Cl.³ ............................................. F16K 15/14
[52] U.S. Cl. .................................... 137/846; 137/847
[58] Field of Search ....................... 137/846, 847, 849; 222/490

[56] References Cited

U.S. PATENT DOCUMENTS

| | | |
|---|---|---|
| 263,259 | 8/1882 | Vreeland . |
| 615,751 | 12/1898 | Sands . |
| 657,007 | 8/1900 | Richter . |
| 813,075 | 2/1906 | Baudin . |
| 1,596,520 | 8/1926 | Eskholme et al. . |
| 2,292,373 | 8/1942 | Groeniger . |
| 2,328,382 | 8/1943 | Langdon . |
| 2,352,642 | 7/1944 | Langdon ............................ 137/849 |
| 2,446,571 | 8/1948 | Browne ............................. 137/847 |
| 2,569,369 | 9/1951 | Brandt . |
| 2,594,318 | 4/1952 | Langdon ....................... 137/846 X |
| 2,598,002 | 5/1952 | Langdon . |
| 2,642,259 | 6/1953 | Catlin . |
| 2,724,442 | 11/1955 | Mundt . |
| 3,369,666 | 2/1968 | Hultgren et al. . |
| 3,429,108 | 2/1969 | Larson . |
| 3,504,699 | 4/1970 | Grise ................................... 137/846 |
| 3,773,233 | 11/1973 | Souza ................................. 222/490 |
| 4,067,414 | 1/1978 | Funke . |
| 4,077,429 | 3/1978 | Kimball . |

Primary Examiner—Robert G. Nilson
Attorney, Agent, or Firm—Poms, Smith, Lande & Rose

[57] ABSTRACT

A normally closed duckbill valve for controlling the direction of fluid flow in a fluid-conducting conduit and a method of manufacturing the valve are provided. The valve is formed of elastomeric material and comprises a generally cylindrical body member provided with an axial fluid passageway having an inlet end and an outlet end provided with an outlet slit, and progressively narrowing in cross-section from the inlet end to the outlet end to define a pair of opposed sealing lips at the outlet slit. Means for normally urging the sealing lips into a closed position are provided and comprise widened lip margins disposed at opposite ends of the outlet slit. The valve is formed by molding the elastomeric material into the preferred shape and then providing the widened lip margins with a closing bias by causing a greater amount of shrinkage in the lip margins, relative to the remaining portions of the sealing lips, during curing of the molded material from an elevated curing temperature to room temperature. One embodiment of the invention is provided with an increasing thickness of material from the generally central portion of each lip outwardly toward the outer edge of each lip margin to provide a leaf spring-like action urging the lips into a closed position.

6 Claims, 8 Drawing Figures

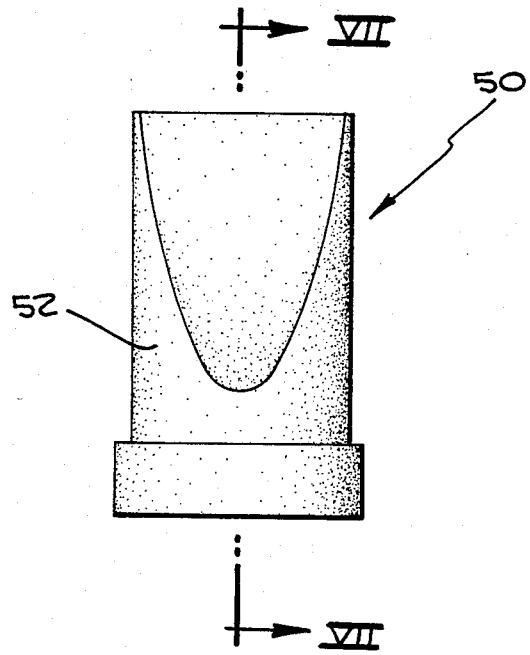
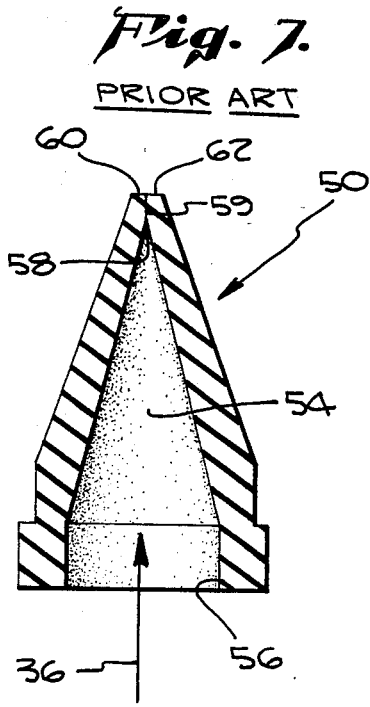
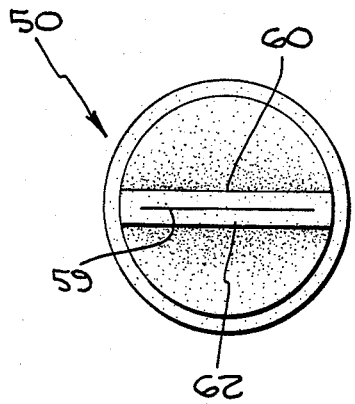
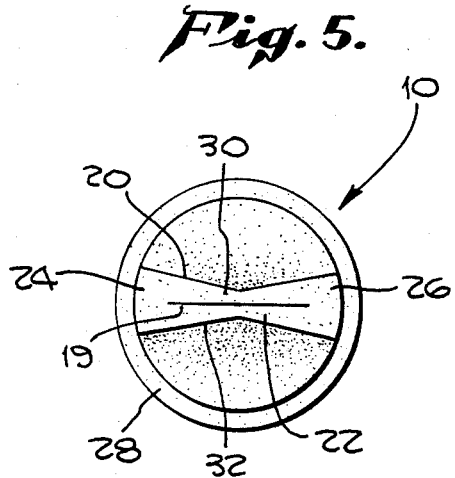

NORMALLY CLOSED DUCKBILL VALVE AND METHOD OF MANUFACTURE

BACKGROUND OF THE INVENTION

1. Field of the Invention

The present invention relates to duckbill valves utilized to control the direction of fluid flow, and, more particularly, to a new duckbill valve that is normally biased to a closed position.

2. Description of Prior Art

Duckbill valves are widely utilized in a variety of applications to prevent the reversal of the direction of flow of various fluids and fluid combinations including liquids, gases, and aerosols. Though simple and inexpensive to manufacture and use, conventional duckbill valves are not without problems.

A typical prior art duckbill valve is illustrated in FIGS. 6, 7, and 8. Valve 50 comprises a body member 52 provided with an axial fluid passageway 54. Body member 52 smoothly tapers from an inlet end 56 to form a wedge-shaped outlet end 58 having an outlet slit 59 defining a pair of resilient sealing lips 60 and 62. As shown in FIG. 8, lips 60, 62 are of a uniform width throughout their respective lengths.

Body member 52 is usually formed of a resilient elastomeric material which is molded into the configuration shown in FIGS. 6-8. This forming process results in a slight amount of heat induced shrinkage to the resilient material of the valve body which imparts a slight opening bias along the length of lips 60, 62, normally urging the lips to a slightly open position.

In operation, valve 50 is usually sealingly positioned in line with a fluid conducting conduit (not shown). A flow of pressurized fluid, as symbolized by the arrow 36, is directed along the conduit and into inlet end 56 of valve 50, along axial passage 54 to outlet end 58 where the pressure exerted by the fluid flow between the adjacent sealing lips deforms lips 60, 62 further away from one another to open outlet slit 59 of the valve to permit fluid flow therethrough. If fluid flow stops or reverses direction, the resilient lips are intended to resume their normal shape and position and the back-pressure exerted by the fluid upon the outer surfaces of the sealing lips forces lips 60, 62 into sealing engagement against one another, closing outlet slit 59 and preventing the backflow of fluid through the valve.

However, in such prior art duckbill valves, a sufficiently strong backflow of fluid quite often will collapse or distort body member 52 causing lips 60, 62 to distort open and leak a reverse fluid flow as a result. Additionally, prior art duckbill valves such as that of FIGS. 6–8 tend to remain open under no flow or low flow conditions, the resiliency of the sealing lips being of insufficient strength to overcome the slight opening bias and to displace the static fluid between the lips to close the valve and prevent fluid leakage.

Early attempts at preventing this undesirable valve body member distortion and resultant fluid leakage are exemplified by U.S. Pat. No. 2,328,382 (Longden), issued Aug. 31, 1943, and U.S. Pat. No. 2,642,259 (Catlin), issued June 16, 1953. Both patents teach the insertion of a rigid cage or spider member within the axial passageway of the valve body member to maintain the shape of the valve body under backflow conditions. While sometimes successful at reducing valve body distortion and leakage, these rigid inserts add to the complexity and expense of the valve and restrict fluid flow through the axial passageway of the valve.

Accordingly, it is a principal object of the present invention to provide a duckbill valve that will be selfbiased to a normally closed position.

It is an additional object of the present invention to provide a duckbill valve that will resist deformation and collapsing.

It is a further object of the present invention to provide a unitary duckbill valve that will be biased to a normally closed position and that is configured so as to resist opening in the desired direction.

SUMMARY OF THE INVENTION

The present invention accomplishes these and other objects through the provision of a duckbill valve having a generally cylindrical body provided with an axial fluid passageway and progressively narrowing in cross section from its inlet end to its outlet end to define a pair of opposed sealing lips about an outlet slit provided at the outlet end. Means for normally urging the lips into a closed position comprising enlarged or widened lip margins are provided at opposite ends of the outlet slit to resist opening of the sealing lips and to exert a compressive force directed toward the slit to bias the lips toward a normally closed position in which the lips are sealingly engaged against one another.

The widened lip margins also add a degree of rigidity to the valve body to enable the valve to resist deformation and collapsing. The lip margins do not intrude into the axial fluid passageway and, therefore, do not restrict fluid flow when the duckbill valve is open.

Additionally, a preferred embodiment of the duckbill valve of the present invention is provided with an increasing thickness of material from the generally central portion of each lip curving outwardly toward the outer edge of each of the thickened lip margins. In addition to increasing the resistance to the opening of the sealing lips and increasing the compressive force exerted by the lip margins, this additional material also exhibits a leaf spring-like action resisting the opening of the lips and serves to direct bending or distorting forces toward the thinner, more flexible center portions of the sealing lips. As a result, deforming forces force the lips into sealing engagement against one another, rather than bowing or deforming the lips away from one another.

Further objects, features, and advantages of the present invention will become apparent from a consideration of the following detailed description and from the accompanying drawings.

BRIEF DESCRIPTION OF THE DRAWINGS

FIG. 5 is a top view of the outlet end of an alternative embodiment of the duckbill valve of the present invention.

FIG. 6 is a side view of a prior art duckbill valve.

FIG. 7 is a sectional view of the prior art valve of FIG. 6 taken through plane VII—VII.

FIG. 8 is a top view of the prior art valve of FIG. 6.

DETAILED DESCRIPTION OF THE PREFERRED EMBODIMENTS

Figure 1:
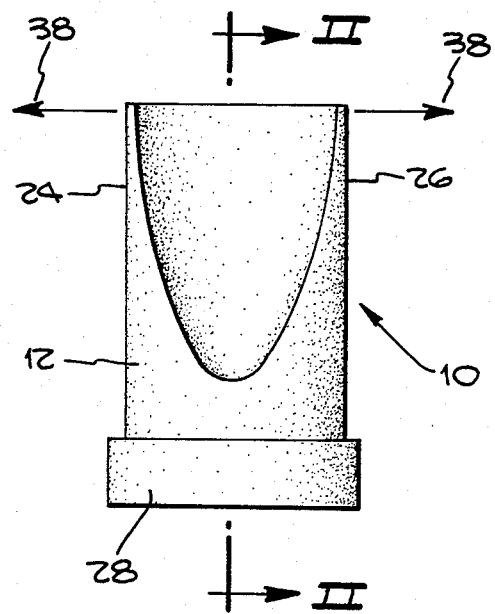
FIG. 1 is a side view of a duckbill valve illustrating the principles of the present invention.
Figure 2:
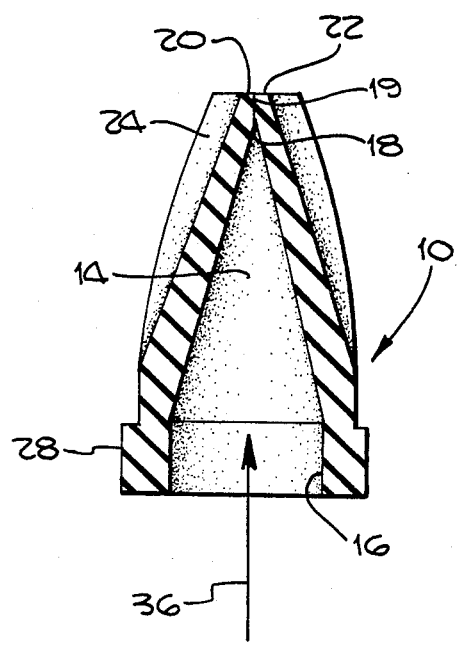
FIG. 2 is a sectional view of the duckbill valve of FIG. 1 taken through the plane II—II of FIG. 1.
Figure 3:
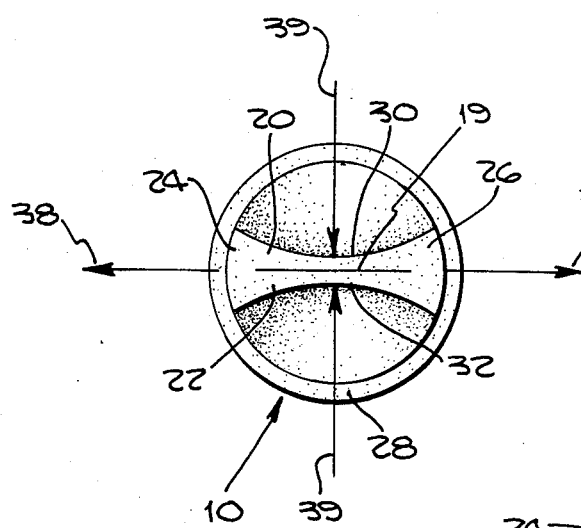
FIG. 3 is a top view of the outlet end of the duckbill valve of FIG. 1.

FIGS. 1, 2, and 3 illustrate a preferred embodiment of the normally closed duckbill valve of the present invention, generally indicated at 10. Valve 10 comprises a generally cylindrical body member 12 provided with an axial fluid passageway 14 having an inlet end 16 and an outlet end 18 provided with an outlet slit 19. In FIG. 2, body member 12 can be seen to progressively narrow in cross section from inlet end 16 to outlet end 18 to define a pair of opposed sealing lips 20 and 22 about an outlet slit 19. Valve 10 is provided with means for normally urging lips 20, 22 into a closed position. In the preferred embodiment of the present invention, this means for normally urging comprises the provision of a plurality of enlarged or widened lip margins 24 and 26 disposed adjacent to the opposite ends of slit 19 to elastically resist the opening of lips 20, 22. Additionally, concavo-concave outer surfaces are laterally disposed to slit 19 and exhibit a leaf spring-like characteristic tending to maintain and urge lips 20, 22 into a closed valve position, as will be discussed in detail below. Also visible in FIGS. 1, 2, and 3 is exterior flange 28 which extends radially outward from the exterior of body member 12 and is located adjacent to inlet end 16 of body member 12.

By providing an additional thickness of resilient material near the opposite ends of lips 20, 22, widened lip margins 24, 26 hold the lips closed by elastically resisting the opening of the lips as a result of the natural tendency of the resilient material forming the lip margins to resist deformation and to resume its natural shape. Additionally, the preferred concavo-concave opposing outer surfaces (formed by providing an increasing thickness of resilient elastomeric material from the generally central portion of each lip outwardly toward the outer edges of each lip margin) are believed to exhibit leaf spring-like characteristics tending to urge lips 20, 22 into a closed position in the following manner. Referring to FIGS. 3 and 5, each opposing concave outer surface acts as a leaf spring having its ends fixed at each lip margin. For example, in FIG. 3, a pair of opposed, generally smoothly curved concavo-concave outer surfaces are shown which act two opposed inwardly curving leaf springs having their respective ends fixed at lip margins 24 and 26. The relatively thin central portions 30, 32 of lips 20, 22, respectively, are able to elastically open in response to a pressurized fluid flow (as shown by arrow 36 in FIG. 2), yet in doing so straighten and, as a result, lengthen the concave, leaf spring-like, outer surface of each lip. To accommodate this increased length, lip margins 24, 26 must move outwardly, as indicated by arrows 38. This outward displacement of lip margins 24, 26 is in turn resisted by the aforementioned natural tendency of the elastomeric material forming the lip margins to resume its natural shape. The result of this leaf spring-like action is a compressive biasing force, indicated by arrows 39, directed toward slit 19, which urges lips 20, 22 into sealing engagement against one another. By providing an increased amount of elastomeric material in the lip margins and hence increasing their resistance to deformation, this compressive force is correspondingly increased. This specific concavo-concave outer configuration of valve 10, as shown in FIG. 3, produces a very high valve opening pressure, as high as eight times that of the prior art valve of FIGS. 6 through 8.

A novel method of forming the normally closed duckbill valve of the present invention is provided according to the following steps. First, an elastomeric material, such as natural rubber, is molded into the preferred valve body shape having an axial fluid passageway provided with an inlet end, outlet end, outlet slit, sealing lips, and widened lip margins as discussed above. Then, the widened lips margins are provided with a closing bias acting against the sealing lips by causing a greater amount of shrinkage in the lip margins than in the remaining portions of the sealing lips during curing of the material from an elevated curing temperature to room temperature. This shrinkage differential elastically deforms the widened portions of the sealing lips into a compressive, at rest state, providing a memory which biases the sealing lips into a closed valve position.

It is preferred that valve 10 be of unitary construction and formed of a resilient elastomeric material having the qualities of natural rubber. This construction is preferred as it simplifies the manufacture and operation of valve 10 and reduces the associated costs. However, it is also contemplated that valve 10 can be formed as a composite structure within the scope and teachings of the present invention. It is contemplated that unitary valve 10 preferably will be molded as a one-piece valve body 12 having lips 20, 22, lip margins 24, 26, and flange 28 integrally formed therewith. In a composite duckbill valve, lip margins 24, 26 are contemplated as being affixed at opposite ends of slit 19 as an additional step in the manufacture of valve 10. Either method of formation is contemplated as being within the teachings of the present invention; however, the unitary method of formation is preferred for the reasons stated above.

In operation, duckbill valve 10 functions to prevent the reversal of the direction of fluid flow in a fluid conducting conduit (not shown). As discussed above with reference to prior art valve 50, fluid flow symbolized by arrow 36 enters axial passageway 14 through inlet end 16, flows through body member 12, to outlet end 18, where the fluid pressure distorts the flexible elastomeric material of lips 20, 22 to force lips 20, 22 apart, opening outlet slit 19 of outlet end 18 to fluid flow. The resilient nature of the material forming valve 10 enables lips 20, 22 to be separated by a flow of pressurized fluid through axial passageway 14. However, when the direction of fluid flow is stopped or reversed, the compressive force exerted by lip margins 24, 26, as discussed above, effectively closes the outlet end 18 of valve 10 by forcing lips 20, 22 towards sealing engagement against one another. Additionally, the normally closed biasing of the duckbill valve of the present invention effectively closes slit 19 in the event of low or static fluid flow by displacing the fluid between lips 20, 22 to allow effective sealing engagement. Lip margins 24, 26 also function to resist deformation and possible resultant leakage of valve 10. As shown in FIG. 2, lip margin 24 and lip margin 26 (not shown) are preferably formed to extend along a portion of the length of body member 12 and to be considerably thicker in cross-section than the remainder of body member 12. This additional material acts as a pair of longitudinal supporting struts and, thereby, significantly increases the strength of body member 12 and hence increases the ability of body member 12 to resist deformation forces imparted by a reversed fluid flow. It will be appreciated that lip margins 24, 26 accomplish this strengthing without restricting the flow of fluid through valve 10 because they do not intrude into axial passageway 14. Additionally, it should be noted that the additional material in lip margins 24, 26 increases the rigidity of the lip margins and hence the normally closed memory or compressive resistance to opening discussed above.

Figure 4:
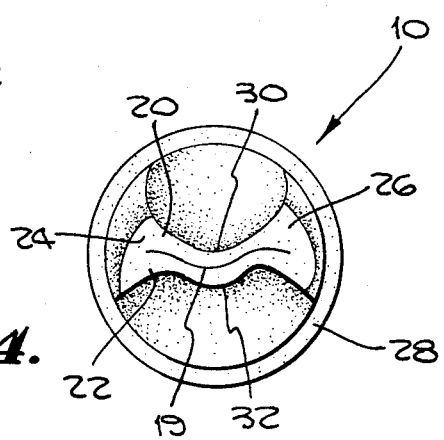
FIG. 4 is a top view of the duckbill valve of FIG. 1, illustrating the principles of the present invention.

Referring now to FIG. 4, it can be seen that the increasing thickness of material forming lips 20, 22, provided by the concavo-concave opposing surfaces of valve 10 also functions to maintain the normally closed position of valve 10 in the event of actual deformation of body member 12 by directing any deforming force toward the thinner central portions 30, 32 of lips 20, 22, respectively. Thus, in the event that lip margins 24, 26 are deformed toward one another, as shown in FIG. 4, the increased thickness of material provided toward the ends of lips 20, 22 prevents the lips from bowing outwardly away from one another by encouraging the lips to flex in combination in the direction of least resistance at the thinner central portions. In FIG. 4, when lip margins 24 and 26 are forced toward one another, lip 20, rather than reversing its normally curved leaf spring-like shape against the compressive force 39 exerted toward slit 19, is forced into sealing contact with lip 22.

It should be noted, that in the event that lip margins 24, 26 are deformed away from one another (not shown), the increased distance between lip margins 24, 26 imparted by such deformation results in the exertion of a tension force along the length of lips 20, 22. This tension force, resulting from the stretching of lips 20, 22 between the outwardly displaced lip margins 24, 26, also serves to maintain the closure of slit 19, by increasing the resistance to opening of lips 20, 22. However, in practice, it is contemplated that the fluid conducting conduit (not shown) within which valve 10 is positioned, will serve to prevent such outward deformation of lip margins 24 and 26.

Referring now to FIG. 5, an alternative embodiment of valve 10 is shown wherein lip margins 24 and 26 are formed by opposing angular concavo-concave outer surfaces laterally disposed to slit 19 which provide a generally constantly increasing thickness of material from the generally central portions 30, 32 of lips 20, 22, respectively, outwardly toward the outer edges of each lip margin. As discussed above with reference to the preferred embodiment of valve 10, lip margins 24, 26 function to bias lips 20, 22 into a normally closed position in sealing engagement against one another by resisting the opening of the lips and exerting a compressive force toward slit 19. Further, lip margins 24, 26 enable body member 12 to resist deformation and resultant leakage in the event that the direction of fluid flow is reversed, as discussed above. In this regard, it will be appreciated that in both embodiments of valve 10, lip margins 24, 26 can be made to axially extend along a considerable portion of the length of body member 12 if desired.

Exterior flange 28 is provided in both embodiments as a means for securing valve 10 in sealing engagement within a fluid conducting conduit (not shown). It is contemplated that flange 28 will seat upon a corresponding shoulder provided in the fluid conducting conduit. However, it is contemplated as being within the scope of the present invention to provide other means of securing valve 10 in sealingly engaged position. Thus, flange 28 can be eliminated and other securing methods such as circlips or clamps may be utilized for this purpose.

Having thus described the preferred embodiments of the present invention, it is to be understood that other mechanical and design variations are within the scope of the present invention. Thus, by way of example and not of limitation, flange 28 can be located differently on the exterior of body member 12 or perhaps even eliminated. Accordingly, the invention disclosed is not limited to the particular arrangements which have been illustrated and described in detail herein.

What is claimed is:

1. A unitary duckbill valve comprising
a generally cylindrical body member provided with an axial fluid passageway and having an inlet end and an outlet end, said outlet end provided with an outlet slit, said body member progressively narrowing in cross-section from said inlet end to define a pair of opposed sealing lips at said outlet slit;
a pair of enlarged lip margins disposed adjacent to the opposite ends of said outlet slit; and
an increasing thickness of material progressively provided from the generally central portion of each of said lips outwardly toward the outer edges of each of said lip margins to form opposing arcuate surfaces which exhibit a leaf-spring-like characteristic tending to maintain and urge said lips into a normally closed valve position.

2. The duckbill valve of claim 1, wherein:
said increasing thickness of material forms relatively smoothly curving opposed concave outer valve body surfaces laterally disposed to said outlet slit which focus and direct the deformation of said body member toward the thinner central portion of said lips to deform said lips toward one another, forcing said lips into sealing contact and preventing said lips from bowing outwardly away from one another under deformation.

3. A normally closed duckbill valve comprising:
a generally cylindrical body member provided with an axial fluid passageway and having an inlet end and an outlet end, said outlet end provided with an outlet slit, said body member formed of a resilient material and progressively narrowing in cross-section from said inlet end to said outlet end to define a pair of opposed sealing lips at said outlet slit;
a plurality of widened lip margins disposed adjacent to opposite ends of said outlet slit holding said sealing lips in a closed position and resisting the opening of said valve; and
an increasing thickness of material provided at the generally central portion of each of said lips and progressively increasing in thickness in outward directions parallelling said slit from said generally central portion of each of said lips toward the outer edges of each of said lip margins to form opposing arcuate outer valve body surfaces which exhibit a leaf-spring-like characteristic tending to compressively force said lips into a normally closed valve position.

4. The duckbill valve of claim 3, wherein:
said increasing thickness of material forms relatively smoothly curving concavo-concave outer valve body surfaces laterally disposed to said outlet slit to focus any deformation forces toward the thinner central portions of said lips to maintain said normally closed position of said lips during deformation of said valve body.

5. A normally closed duckbill valve comprising:

a generally cylindrical body member provided with an axial fluid passageway and having an inlet end and an outlet end, said outlet end provided with an outlet slit, said body member being formed of a resilient material and having a pair of opposed sealing lips at said outlet slit; and a plurality of widened lip margins disposed adjacent to the opposite ends of said outlet slit, said lip margins having an increasing thickness of material provided from the generally central portion of each of said lips progressively widening each of said lips outwardly to each of said lip margins to define mutually inclined opposing arcuate concavo-concave outer valve body surfaces laterally disposed to said outlet slit which exhibit a leaf-spring-like characteristic compressively biasing said lips into normally closed sealing engagement.

6. The duckbill valve of claim 5, wherein:

said concavo-concave outer valve body surfaces have generally smoothly curving outer surfaces which focus and direct the deformation of said body member toward the thinner central portion of said lips to deform said lips toward one another, forcing said lips into sealing contact and preventing said lips from bowing outwardly away from one another during deformation of said body member.

* * * * *